Apr. 24, 1923.

H. G. HAWORTH 1,452,735

STREET SWEEPING MACHINE

Filed May 7, 1919

Inventor

Henry G. Haworth

By W. F. Davis & Son

Attorney

Apr. 24, 1923.

H. G. HAWORTH

STREET SWEEPING MACHINE

Filed May 7, 1919

Inventor
Henry G. Haworth

By W. F. Davis & Son
Attorney

Apr. 24, 1923.

H. G. HAWORTH 1,452,735

STREET SWEEPING MACHINE

Filed May 7, 1919  5 Sheets-Sheet 3

Inventor
Henry G. Haworth
By W. F. Davis & Son
Attorney

Apr. 24, 1923.

H. G. HAWORTH

STREET SWEEPING MACHINE

Filed May 7, 1919

Inventor
Henry G. Haworth
By W. F. Davis & Son
Attorney

Apr. 24, 1923.  
H. G. HAWORTH  
STREET SWEEPING MACHINE  
Filed May 7, 1919  
1,452,735  
5 Sheets-Sheet 5

Inventor  
Henry G. Haworth  
By W. F. Davis & Son  
Attorney

Patented Apr. 24, 1923.

1,452,735

UNITED STATES PATENT OFFICE.

HENRY G. HAWORTH, OF LEAVENWORTH, KANSAS, ASSIGNOR OF ONE-HALF TO BENJAMIN F. SAMUELS, OF LEAVENWORTH, KANSAS.

STREET-SWEEPING MACHINE.

Application filed May 7, 1919. Serial No. 295,443.

*To all whom it may concern:*

Be it known that I, HENRY G. HAWORTH, a citizen of the United States, residing at Leavenworth, in the county of Leavenworth and State of Kansas, have invented certain new and useful Improvements in Street-Sweeping Machines, of which the following is a full, clear, and exact description, such as will enable others skilled in the art to which it appertains to make and use the same.

The invention relates to street sweeping machines, and more particularly to a machine to follow the curb stone of the usual city street and sweep the refuse from the gutter into the path of a rear broom which sweeps the paving and discharges the sweepings therefrom as well as the gutter refuse into an elevator from where the sweepings and refuse are elevated and discharged into a receptacle from which they may be emptied from time to time.

It is not new to sweep the gutter, or to elevate the sweepings and deposit them into a receptacle, but certain improvements are embodied in the present construction which enables the operator to accurately guide the machine so that the gutter broom will follow the gutter, and means is provided to regulate the pressure of the rear broom on the paving so that it will follow the usual uneven surface thereof and sweep the low places as well as the high ones.

A floating elevator always self adjusting to the uneven surface of the paving, and a means to maintain the speed of the brooms and elevator while turning corners are important features of the improvements.

With these and other objects in view, the invention consists in the features of construction, combinations and arrangements of parts hereinafter set forth and more particularly pointed out in the appended claims, the accompanying drawings illustrating a street sweeping machine in which the improvements are embodied.

In the drawings:—

Figure 1:
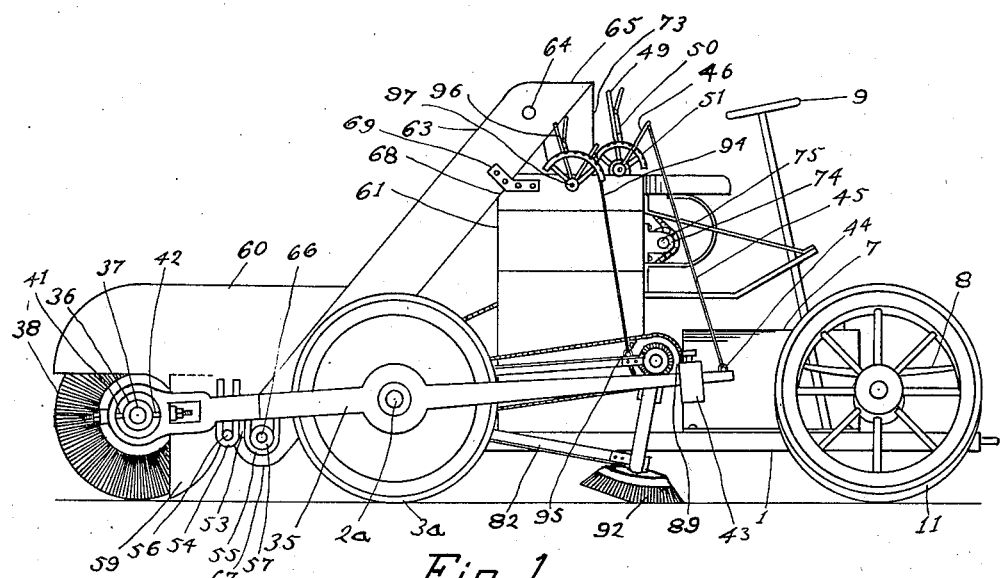
Fig. 1 is a view in side elevation of a street sweeping machine in which the improvements are embodied.
Figure 2:
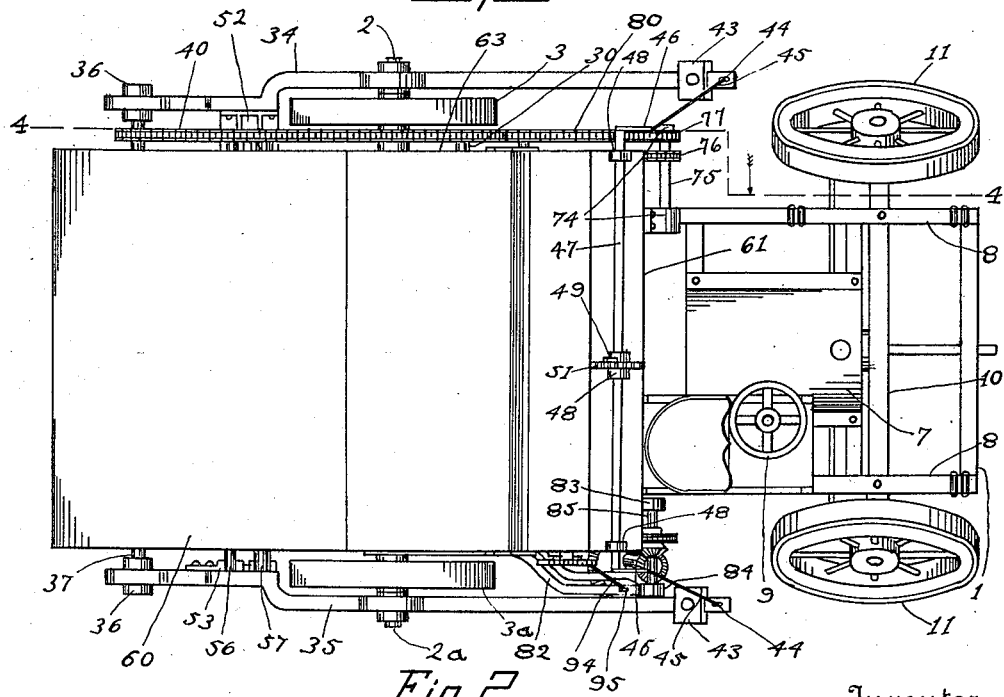
Fig. 2 is a plan view of the machine.
Figure 3:
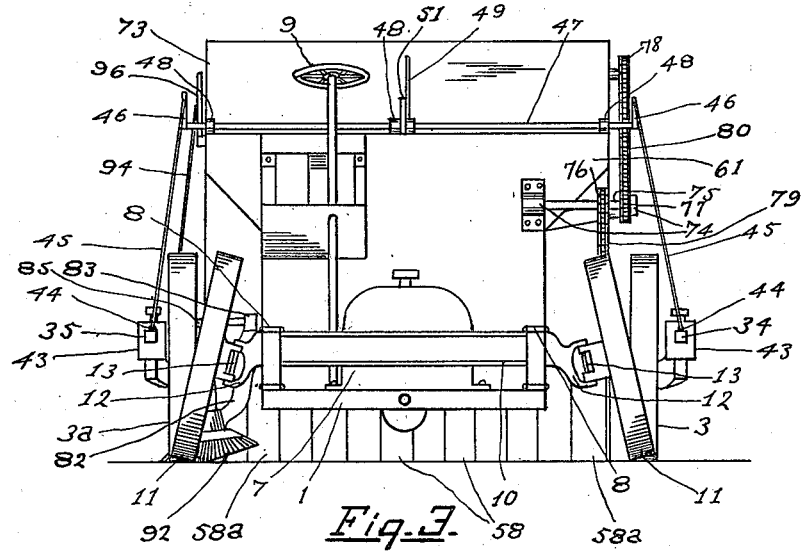
Fig. 3 is a front view in elevation.
Figure 4:
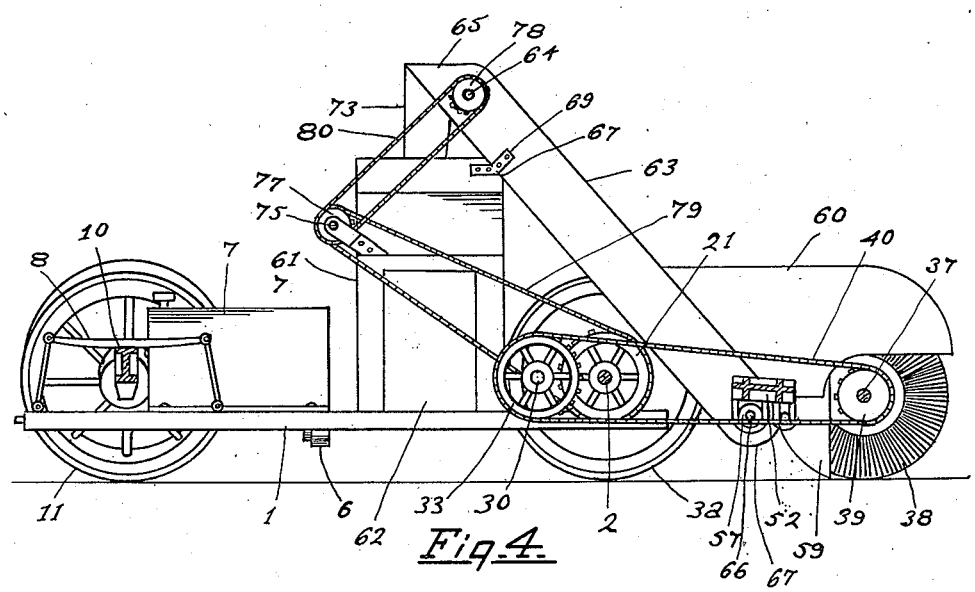
Fig. 4 is a vertical longitudinal sectional view taken on line 4—4 of Fig. 2.

The frame 1, rear axle shaft 2, 2ª, rear supporting wheels 3, 3ª, axle housing 4, gear casings 5 and 6, engine 7, front springs 8, and steering wheel 9 are of common and well known construction in motor driven machines. The axle shaft is divided as usual and the wheels 3 and 3ª are rigidly mounted on the respective ends of the shaft.

The front axle 10 and front wheels 11 are of common and well known construction, excepting that the forks 12 are formed as shown so that the fork pins 13 can connect the wheels on upwardly inwardly inclining angles as shown with the tread of the wheels the same width as that of the rear wheels 3 and 3ª so that the latter will track in the same tracks.

The front wheels 11 are connected to the axle 10 on the inclining angle as shown so that they can be steered along and against the street curb for the purpose of sweeping the street gutter as will hereinafter appear.

Figure 8:
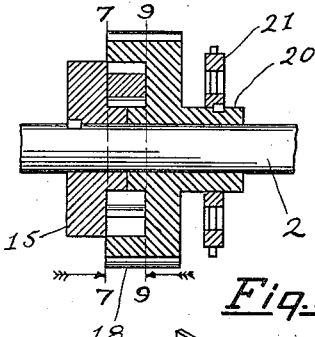
Fig. 8 is an enlarged fragmentary sectional view taken on line 8—8 of Fig. 6.
Figure 7:
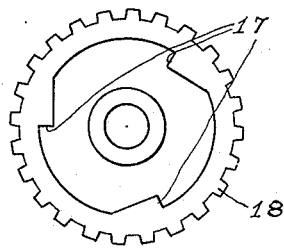
Fig. 7 is an enlarged view of one of the clutch gear wheels taken on line 7—7 of Fig. 8.
Figure 15:
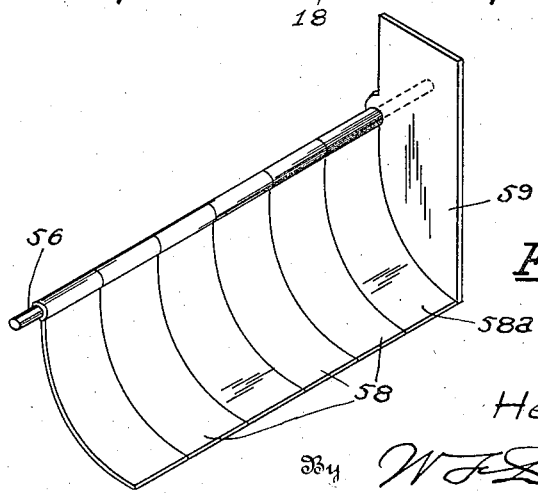
Fig. 15 is an enlarged fragmentary perspective view of the rear broom apron.
Figure 16:
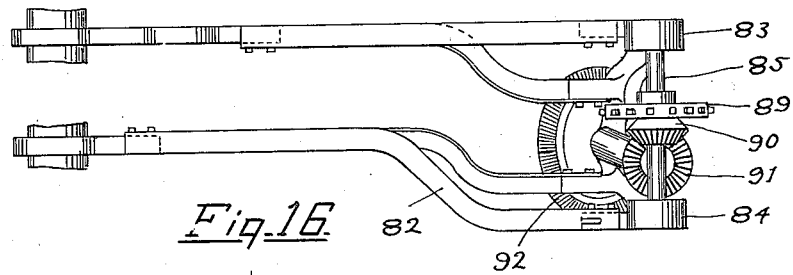
Fig. 16 is an enlarged plan view of the gutter broom frame and gutter broom.
Figure 17:
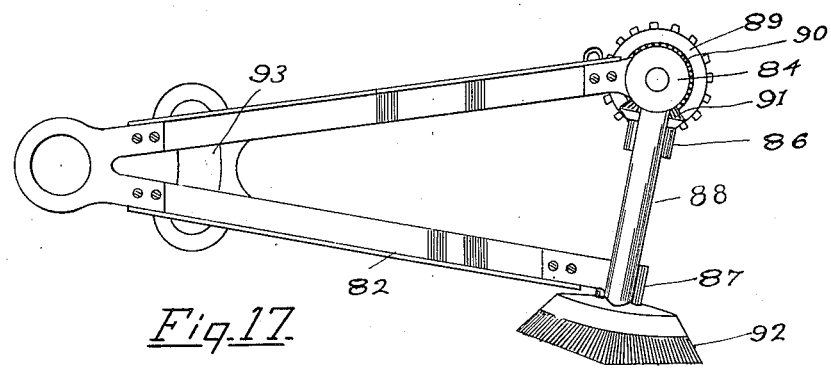
Fig. 17 is an enlarged view in side elevation of the gutter broom and gutter broom frame.
Figure 19:
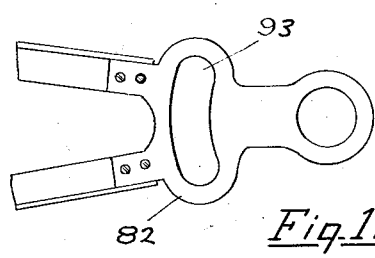
Fig. 19 is an enlarged fragmentary view in side elevation of the gutter broom frame.
Figure 18:
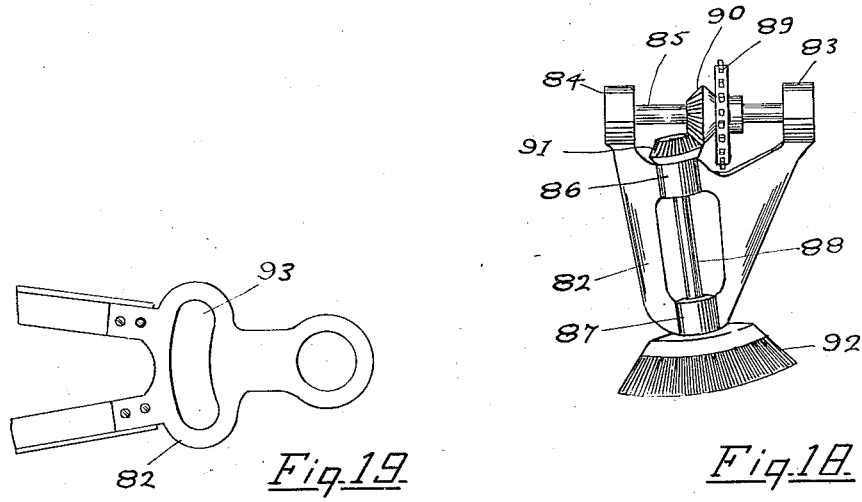
Fig. 18 is an enlarged front view in elevation of the gutter broom frame and gutter broom.

The axle housing 4 is secured to the frame 1 in the usual manner by the clamp boxes 14 and on the axle 2 between the box 14 and the wheel 3 is rigidly mounted the clutch member 15 which has pivotally connected thereto the ratchet jaws 16 to engage the teeth 17 of the gear wheel 18, the latter being revolvably mounted on the shaft as shown in Fig. 8. The springs 19 are pivoted to the clutch member 15 and are always in tension to hold the jaws 16 in engagement with the teeth 17. On the hub 20 of the gear wheel 18 is mounted the sprocket wheel 21 to drive the elevator as will hereinafter appear.

On the axle shaft 2ª is rigidly mounted the clutch member 22 to which is pivotally connected the jaws 23 to engage the teeth 24 of the gear wheel 25. The gear wheel 25 is revolvably mounted on the axle shaft 2ª and has rigidly mounted on the hub 26 thereof, the sprocket wheel 27 to drive the gutter broom as will hereinafter appear.

The springs 28 are pivotally connected to the clutch member 22 and are always in tension to hold the jaws 23 in engagement with the ratchet teeth 24.

From the foregoing it will be understood that when the axle shaft 2, 2ª is driven in a forward motion that will cause the rear wheels 3, 3ª to trail or follow the front wheels 11, the gear wheels 18 and 25 will be driven with the axle, but when the axle is driven in the opposite direction the gear wheels will not be driven thereby.

Adjacent the boxes 14 upon the frame 1 are the journal boxes 29, in which is journaled the counter shaft 30, with the duplicate gear wheels 31 and 32 rigidly mounted thereon and respectively meshing with the gear wheels 18 and 25. The sprocket wheel 33 is rigidly mounted on the shaft 30 to drive the rear broom as will hereinafter appear.

From the foregoing it will be understood that if either of the wheels 3 or 3ª encounter a slippery paving the other wheel will drive the sprocket wheels 21, 17 and 33, and in turning a corner, the outer wheel 3 or 3ª will drive the sprocket wheels at a speed corresponding to the speed of the fastest revolving wheel, and this is true whether the machine be driven by the engine 7 or drawn by animals.

It is not desired to confine the use of the improved machine to motor driven machines as it is obvious that it may be drawn by animals.

Journaled on the rear axle shaft 3, 3ª are the rear broom lever shaped frame members 34 and 35, each of which extends rearwardly from the wheels 3, 3ª and is provided with the journal box 36 to receive the rear broom shaft 37, on which is mounted the rear broom 38 of usual construction. The shaft 37 has rigidly mounted thereon, the sprocket wheel 39 which is driven from the sprocket wheel 33 by the sprocket chain 40.

It will be noticed that the gear wheels 18 and 25, and 31 and 32 reverse the counter shaft 30 so that the broom 38 is rotated in a direction that will cause it to sweep the sweepings toward the wheels 3 and 3ª when the machine advances.

The journal boxes 36 for the rear broom shaft 37 are secured in the pivoted frame members 34 and 35 by the adjusting screws 41 and 42 so that the boxes may be adjusted to a greater or less distance from the counter shaft 30 to correspond to the length of the sprocket chain 40 and to provide for the lengthening of the chain by wear. The screws 41 and 42 provide a pivotal connection of the journal boxes to the frame members 34 and 35 so that the rear broom 38 may rise and fall at either end thereof independently of the other end and follow the uneveness of the paving or road surface. This is very advantageous as no paving or road has a true level surface and many city streets are very uneven and punctured with many holes.

The rear broom carrying members 34 and 35 extend forwardly from the rear axle shaft 2, 2ª and are each provided with a weight 43 which can be moved toward and from the axle shaft and locked in the desired position to so counterweight the rear broom 38 as to secure the desired pressure of the broom on the paving or road surface, it being understood that the broom is held in contact with the paving or road surface by gravity so that the broom will follow the uneven surface that is to be swept.

Pivotally connected to the front ends of members 34 and 35 at 44 are the rods 45 which are pivotally connected to the arms 46 that are rigidly mounted on the rock shaft 47, the shaft being journaled in the boxes 48 rigidly secured to the sweepings receptacle 61.

The shaft 47 is provided with the lever 49 mounted rigidly thereon, to which is connected the latch 50 to engage the latch bar 51, so that the weighted ends of the members 34 and 35 can be thrust downwardly and the broom 38 lifted from and above the paving, so that the broom will not drag thereon when not in use, and to remove the weight from the broom when standing idle.

Secured to the members 34 and 35 are the carrying members 52 and 53 respectively, each provided with a deep half box 54 and one 55 to receive the rear broom apron shaft 56 and the elevator boxes 57 respectively.

Figure 5:
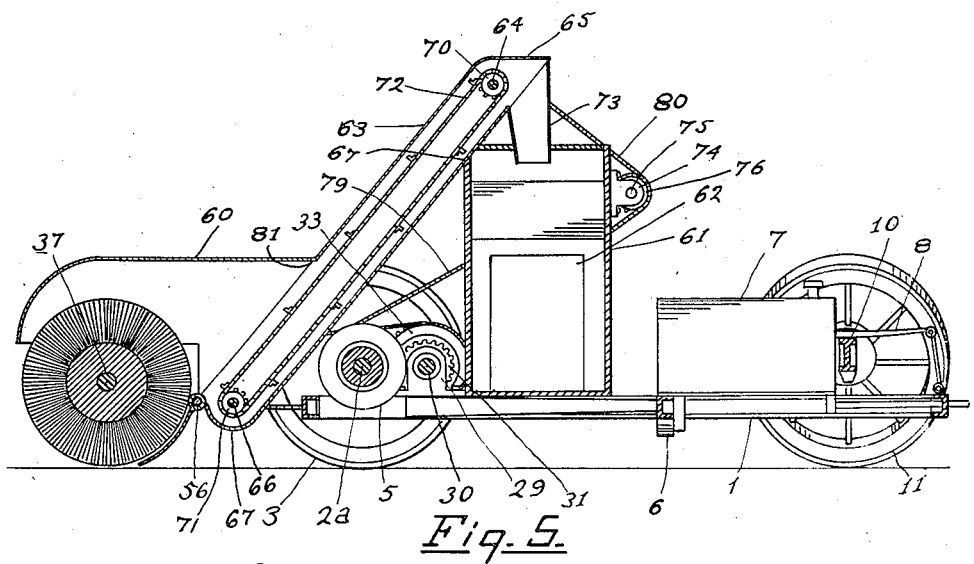
Fig. 5 is a vertical longitudinal sectional view taken on line 5—5 of Fig. 6.
Figure 6:
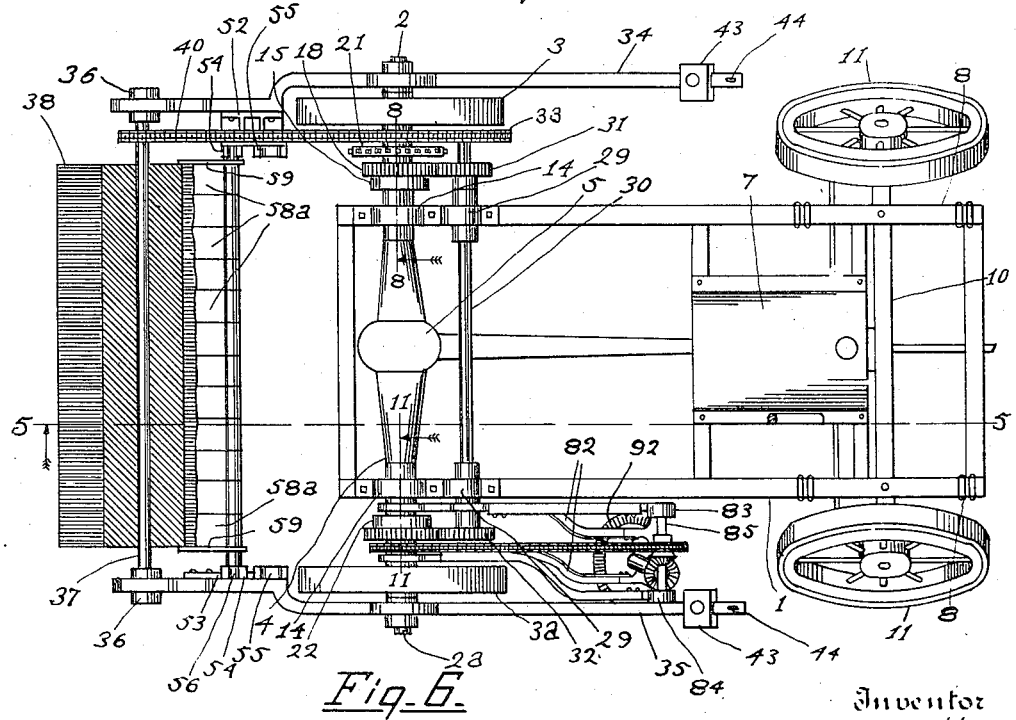
Fig. 6 is a plan view with the elevator, sweepings receptacle and accompanying parts removed.
Figure 12:
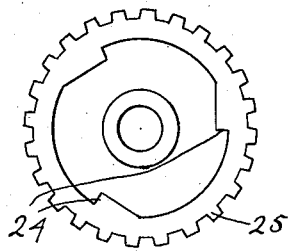
Fig. 12 is an enlarged view of one of the clutch gear wheels taken on line 12—12 of Fig. 11.
Figure 11:
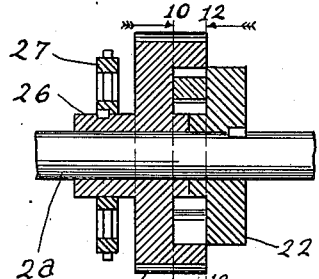
Fig. 11 is an enlarged fragmentary view in section, taken on line 11—11 of Fig. 6.
Figure 10:
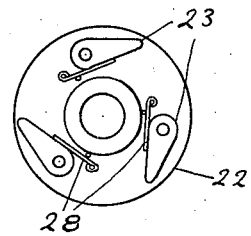
Fig. 10 is an enlarged view of one of the clutches taken on line 10—10 of Fig. 11.
Figure 13:
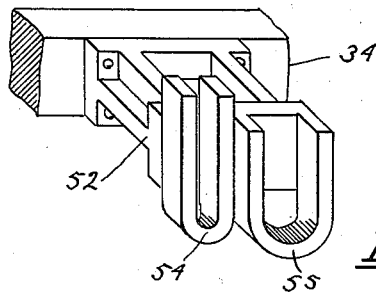
Fig. 13 is an enlarged perspective view of the carrying members for the rear broom apron and the lower end of the elevator.
Figure 14:
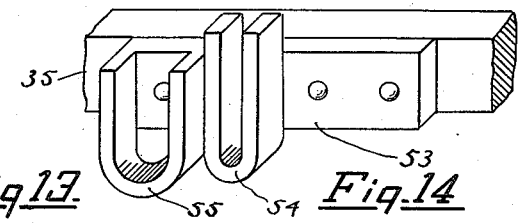
Fig. 14 is an enlarged perspective view of the opposite carrying member for the rear broom apron and the lower end of the elevator.
Figure 9:
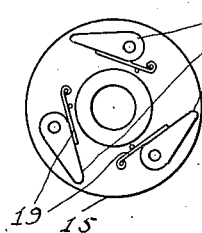
Fig. 9 is an enlarged view of one of the clutches taken on line 9—9 of Fig. 8.

The apron shaft 56 rests loosely in the half boxes 54 and has loosely mounted thereon, the metal aprons 58 over which the broom 38 sweeps the sweepings. The principal object of the shaft 56 resting loosely in the deep boxes 54 is to allow the shaft to raise in the boxes when the apron is turned underneath the shaft by moving the machine backward, or by raising the broom 38 and then lowering it. It is obvious that the shaft 56 will raise in the boxes 54 and when the machine is moved forward the shaft and the aprons will return to normal position as shown in Fig. 5, and the aprons will rest on the paving so the broom 38 will not sweep sweepings underneath the aprons.

To the end apron 58ᵃ is secured the shield 59 which forms a wall outside of the broom 38 and extends upward within the broom casing 60 so that no sweepings can escape over the respective end of the aprons.

The sweepings receptacle 61 is rigidly mounted on the frame 1 and provided with the door 62 for the purpose of removing the sweepings when a quantity has been deposited therein.

The elevator casing 63 has the upper shaft 64 journaled therein near the upper end 65 of the casing, and the lower shaft 66 journaled in the boxes 57 near the lower end 67 of the casing. The boxes 57 project laterally on both sides from the casing and rest in the deep half boxes 55 which form a flexible rest for the lower end of the elevator casing.

The elevator casing rests on the sweepings receptacle 61 at 68 between the plates 69 which are secured to the receptacle and prevent the casing from moving laterally on the receptacle.

The sprocket wheels 70 and 71 are secured to the elevator shafts 64 and 66 respectively, and the conveying apron 72 is mounted thereon so that any sweepings that are swept by the rear broom 38 into the lower end 67 of the elevator casing are elevated to the upper end 65 of the casing and discharged into the spout 73 where they fall by gravity to the sweepings receptacle 61. The spout 73 is preferably of canvas and secured to the cover of the receptacle so that no dust can escape from the spout or receptacle.

To the sweepings receptacle 61 is secured the journal boxes 74 in which is journaled the elevator counter shaft 75. The sprocket wheels 76 and 77 are rigidly mounted on the shaft 75 and the sprocket wheel 78 is rigidly mounted on the upper elevator shaft 64. The sprocket chain 79 is mounted on the sprocket wheels 21 and 76 and drives the counter shaft 75 from the hub 20 of the gear wheel 18. The sprocket chain 80 is mounted on the sprocket wheels 77 and 78 and drives the upper elevator shaft 64 from the counter shaft 75.

It will be noticed that the centers of the elevator shafts 64 and 66 and the center of the counter shaft 75 form approximately a right angle and the counter shaft 75 is purposely arranged in this position with relation to the shafts 64 and 66 so that as the broom 38 is raised or lowered by the lever 49 or by following the unevenness of the street when sweeping, the elevator casing 63 will move upward and downward on the sweepings receptacle 61 and the distance between the shafts 64 and 75 will not be sufficiently changed to interfere with the operation of the sprocket chain 79.

The rear broom casing 60 is rigid with the elevator casing 63, covers the broom 38 and is open to the elevator casing from 81 to the aprons 58, so that all the sweepings swept over the aprons must enter the casing.

By removing the sprocket chain 80 the elevator casing 63 and the broom casing 60 can be lifted bodily from the machine, and the apron shaft 56 and the aprons 58 can be lifted from the machine, all of which is very advantageous in the event of repairs being required and in moving and shipping the machine.

The gutter broom frame 82 is pivotally journaled on the parts encircling the axle shaft 2ᵃ, the object being to pivot the frame so that the center of the shaft will be the center of the pivotal connection.

The gutter broom frame 82 extends forwardly from the axle shaft 2ᵃ and is provided with the journal boxes 83 and 84 in which is journaled the horizontally disposed counter shaft 85, and with the journal boxes 86 and 87 in which is journaled the upright obliquely disposed gutter broom shaft 88.

The counter shaft 85 is approximately parallel with the axle shaft 2ᵃ and has rigidly mounted thereon the sprocket wheel 89 and the bevel gear wheel 90.

The gutter broom shaft 88 has rigidly mounted thereon the bevel gear wheel 91 meshing with the bevel gear wheel 90, and the gutter broom 92, the shaft inclining from the bevel gear wheel 91 downwardly and rearwardly toward the rear broom 38 and inwardly toward the center of the frame 1, so that the gutter broom will sweep the sweepings from the gutter toward the center of the path of the rear broom 38.

The gutter frame 82 is slotted at 93 so that the broom 92 may be lifted and lowered without interfering with the counter shaft 30 which passes through the slot.

The lifting rod 94 is pivotally connected to the gutter broom frame 82 at 95 and to the lever 96, the lever being pivotally connected to the sweepings receptacle 61 at 97 so that the gutter broom 92 may be lowered and raised with the lever 96, the broom being shown in lowered position, and it being understood that it may be raised fom lowered position when not in use.

In operation it does not matter whether the improved street sweeping machine is drawn by animals or driven by the engine 7, in either case the front wheel 11 adjacent the gutter broom 92 is steered by the steering wheel 9 so that it will run along the gutter, and where there is a curb the wheel 11 is run against the curb, the adjacent wheel 3ª following in the tracks of the wheel 11. The gutter broom 92 is in lowered position as shown and when not obstructed will reach outward beyond the path of the wheels 3ª and 11 and sweep the sweepings from the gutter into the path of the advancing rear broom 38 which will sweep the gutter sweepings together with the other sweepings in the path of the broom, over the aprons 58 into the elevator casing 63, from where the conveying apron 72 will elevate the sweepings and deposit them in the spout 73 and they will fall by gravity into the sweepings receptacle 61.

The gutter broom 92 is of ordinary flexible construction and will where there is no curb reach outward beyond the path of the wheels 2ª and 11, but where there is a curb the wheels 2ª and 11 may be run against the curb and the broom will contact with and sweep the curb clean of all refuse.

What I claim as new, and desire to secure by Letters Patent, is:—

1. In a street-sweeping machine, the combination of a frame, a receptacle on the frame, an axle shaft on the frame near the rear end of the same, supporting arms pivotally mounted intermediate their ends on the ends of the axle shaft, counter-weights on the front ends of said arms, journal boxes pivotally secured in the rear ends of said arms, a rotary broom journaled in said boxes, open top bearings carried by said arms intermediate said broom and axle shaft, an inclined elevator having a lower shaft removably journalled in said open top bearings and its upper end supported against the top of said receptacle, an apron carried by said arms between the elevator and the rotary broom, and means for driving said broom and the elevator from the axle shaft.

2. In a street-sweeper, the combination of a frame, an axle shaft mounted transversely thereon near the rear end thereof, balanced arms pivoted on the ends of the axle shaft, a rotary broom carried by and between the rear ends of said arms, a receptacle on the frame, open top bearings on the inner sides of the pivoted arms near the rear ends thereof, an elevator discharging into the receptacle and having its lower shaft loosely fitted in the forward open-top bearings, an apron having end pivots loosely mounted in the rear open-top bearings, and means for driving said broom and the elevator from the axle shaft.

3. In a street-sweeper, the combination of a portable frame, an axle shaft thereon, a counter-shaft in advance of the axle shaft and geared thereto, a broom supported transversely in rear of the axle shaft and driven from the counter-shaft, a frame pivoted about the axle shaft and extending forwardly therefrom, and having an intermediate slotted portion through which the countershaft passes, a gutter broom mounted in the front end of said frame, and means for driving said gutter broom from the axle shaft.

HENRY G. HAWORTH.